(12) United States Patent
Kanno

(10) Patent No.: US 6,713,934 B2
(45) Date of Patent: Mar. 30, 2004

(54) GENERATOR FOR AN OUTBOARD MOTOR

(75) Inventor: Isao Kanno, Shizuoka (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 0 days.

(21) Appl. No.: 10/015,813

(22) Filed: Nov. 2, 2001

(65) Prior Publication Data

US 2002/0053854 A1 May 9, 2002

(30) Foreign Application Priority Data

Nov. 7, 2000 (JP) .................................. 2000-339505

(51) Int. Cl.[7] .......................... H02K 16/00; H02K 9/00; F02P 5/02
(52) U.S. Cl. .......................... 310/254; 310/59; 310/58; 310/64; 310/65; 310/60 R; 310/52; 310/259; 310/258; 310/260; 29/1
(58) Field of Search .......................... 310/59, 58, 64, 310/65, 254, 60 R, 52, 258, 260, 259; 29/1

(56) References Cited

U.S. PATENT DOCUMENTS

| | | | | |
|---|---|---|---|---|
| 3,584,248 A | * | 6/1971 | Higashino et al. | 310/68 R |
| 3,694,661 A | * | 9/1972 | Minowa | 290/1 R |
| 4,255,684 A | * | 3/1981 | Mischler et al. | 310/216 |
| 4,303,842 A | * | 12/1981 | Nathenson | 310/64 |
| 4,308,517 A | * | 12/1981 | Peterson | 337/372 |
| 4,430,591 A | * | 2/1984 | Nemeni et al. | 310/71 |
| 4,990,812 A | * | 2/1991 | Nam | 310/261 |
| 5,078,101 A | * | 1/1992 | Anderson et al. | 123/41.31 |
| 5,091,666 A | * | 2/1992 | Jarczynski | 310/54 |
| 5,159,916 A | * | 11/1992 | Isogawa | 123/406.56 |
| 5,234,363 A | * | 8/1993 | Motose | 440/77 |
| 5,370,563 A | * | 12/1994 | Yamazaki et al. | 440/77 |
| 5,693,996 A | * | 12/1997 | Neidhofer et al. | 310/260 |
| 5,904,604 A | * | 5/1999 | Suzuki et al. | 440/84 |
| 5,917,144 A | * | 6/1999 | Miyake et al. | 136/205 |
| 6,005,310 A | * | 12/1999 | Mosciatti et al. | 310/12 |
| 6,043,583 A | * | 3/2000 | Kurosawa et al. | 310/254 |
| 6,184,599 B1 | * | 2/2001 | Okabe et al. | 310/64 |
| 6,191,510 B1 | * | 2/2001 | Landin et al. | 310/51 |
| 6,201,321 B1 | * | 3/2001 | Mosciatti et al. | 310/43 |
| 6,346,759 B1 | * | 2/2002 | Suzuki et al. | 310/254 |
| 6,445,095 B1 | * | 9/2002 | Liang et al. | 310/64 |
| 6,446,324 B1 | * | 9/2002 | Takarasawa et al. | 29/596 |
| 6,455,976 B1 | * | 9/2002 | Nakano | 310/254 |
| 6,455,977 B2 | * | 9/2002 | Leyvraz et al. | 310/254 |
| 6,489,697 B1 | * | 12/2002 | Ozawa et al. | 310/54 |
| 6,563,244 B1 | * | 5/2003 | Yamauchi et al. | 310/90.5 |
| 2002/0053854 A1 | * | 5/2002 | Kanno | 310/254 |
| 2002/0130573 A1 | * | 9/2002 | Kikuchi et al. | 310/91 |

FOREIGN PATENT DOCUMENTS

EP 0632566 A1 * 6/1994 ............ H02K/9/22

* cited by examiner

Primary Examiner—Burton S. Mullins
Assistant Examiner—H. Elkassabgi
(74) Attorney, Agent, or Firm—Knobbe, Martens, Olson & Bear, LLP

(57) ABSTRACT

An engine includes an engine body and a generator. The engine body has a stator bracket mounted to the cylinder block. The generator incorporates a rotor flywheel and an armature assembly consisting of armature legs. Various metal plates with high magnetic permeability make up the armature legs and are securely fastened in a radial manner to the similar plate made of aluminum. The stacked armature legs surround the crankshaft and are mounted to the stator bracket. The preferred heat conduction path travels from the armature legs through the aluminum plate on onto the stator bracket in order to improve the heat dissipation of the generator.

13 Claims, 4 Drawing Sheets

GENERATOR FOR AN OUTBOARD MOTOR

PRIORITY INFORMATION

This application is based on and claims priority to Japanese Patent Application No. 2000-339505, filed Nov. 7, 2000, the entire contents of which is hereby expressly incorporated by reference.

FIELD OF THE INVENTION

The present invention relates generally to a generator arrangement for an engine, and more particularly to an improved generator cooling arrangement for a watercraft engine.

DESCRIPTION OF THE RELATED ART

Watercraft engines typically incorporate electrical generators. The generator rotor is rotated by the engine and the electricity produced is used to recharge the battery or to directly power the ignition system used to ignite the fuel/air mixture inside the cylinder of the engine. Due to the compact design and waterproofing of watercraft engines and the fact that the generator itself produces heat, dissipation of the heat within the generator is an ongoing concern in watercraft applications.

U.S. Pat. No. 6,184,599 assigned to Sanshin Kogyo Kabushiki Kaisha describes improvements in cooling generators including the use of cooling jackets and heat transfer elements.

SUMMARY OF THE INVENTION

The preferred embodiments of the present invention, while having a very compact and confined waterproof design, effectively and cost efficiently dissipate the heat created by the generator on an engine in a watercraft.

The stator armature of the generator includes a stack of plates of iron or other material having a high magnetic permeability. The individual plates are insulated from each other by a suitable dielectric. In addition, the stack includes a plate of aluminum that has substantially the same length and width dimensions. The armature coil is then wound around the entire assembly of plural iron plates and the abutting aluminum plate such that the aluminum plate is an integral part of the armature. A generally circular stator mounting bracket is also formed of aluminum. One surface of this bracket directly abuts the engine block. The opposite surface of this bracket directly abuts the aluminum plate integral with the armature stator.

The aluminum plate is thus strategically positioned between the stacked metal plates and the aluminum stator bracket in order to very effectively dissipate heat away from the metal plates of the stator. As a result, the heat produced by resistors heating of the armature coils is directly conducted from the coils and armature iron plates through the integral aluminum plate and the aluminum mounting bracket to the engine block.

BRIEF DESCRIPTION OF THE DRAWINGS

These and other features, aspects and advantages of the present invention will now be described with reference to the drawings of a preferred embodiment, which is intended to illustrate and not to limit the invention. The drawings comprise four figures.

DETAILED DESCRIPTION OF THE PREFERRED EMBODIMENT

The Overall Construction

Figure 1:
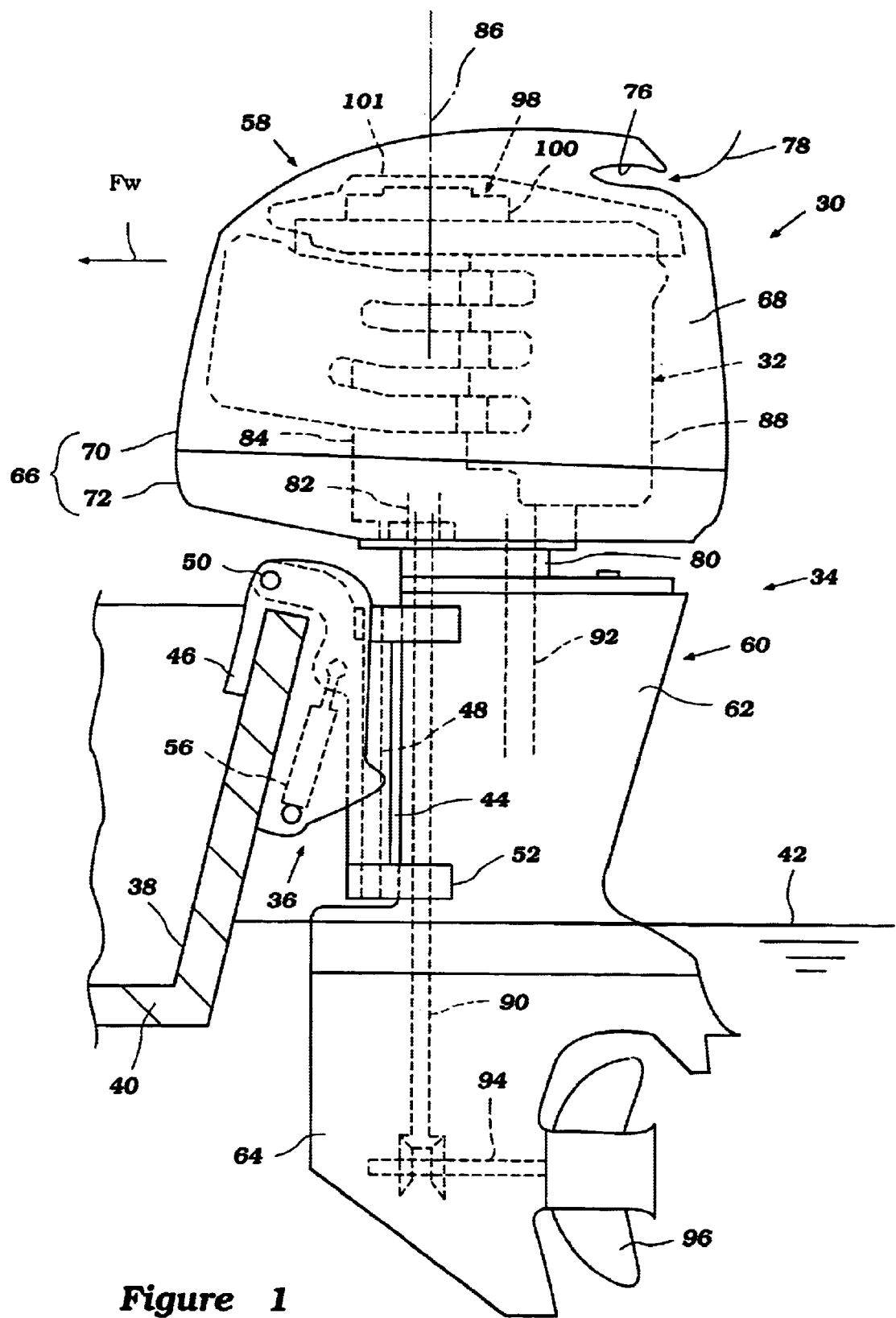
FIG. 1 is a side elevational view of an outboard motor configured in accordance with a preferred embodiment of the present invention. An associated watercraft is partially shown in section.

With reference to FIG. 1 an overall construction of an outboard motor 30 that employs an internal combustion engine 32 configured in accordance with certain features, aspects and advantages of the present invention will be described. The engine 32 has particular utility in the context of a marine drive, such as the outboard motor 30 for instance, and thus is described in the context of an outboard motor. The engine 32, however, can be used with other types of marine drives (i.e., inboard motors, inboard/outboard motors, etc.) and also certain land vehicles, which includes lawnmowers, motorcycles, go carts, all terrain vehicles and the like. Furthermore, the engine 32 can be used as a stationary engine for some applications that will become apparent to those of ordinary skill in the art.

In the illustrated arrangement, the outboard motor 30 generally comprises a drive unit 34 and a bracket assembly 36. The bracket assembly 36 supports the drive unit 34 on a transom 38 of an associated watercraft 40 and places a marine propulsion device in a submerged position with the watercraft 40 resting relative to a surface 42 of a body of water. The bracket assembly 36 comprises a swivel bracket 44, a clamping bracket 46, a steering shaft 48 and a pivot pin 50.

The steering shaft 48 typically extends through the swivel bracket 44 and is affixed to the drive unit 34 by top and bottom mount assemblies 52. The steering shaft 48 is pivotally journaled for steering movement about a generally vertically extending steering axis defined within the swivel bracket 44. The clamping bracket 46 comprises a pair of bracket arms that preferably are laterally spaced apart from each other and that are attached to the watercraft transom 38.

The pivot pin 50 completes a hinge coupling between the swivel bracket 44 and the clamping bracket 46. The pivot pin 50 extends through the bracket arms so that the clamping bracket 46 supports the swivel bracket 44 for pivotal movement about a generally horizontally extending tilt axis defined by the pivot pin 50. The drive unit 34 thus can be tilted or trimmed about the pivot pin 50.

As used through this description, the terms "forward," "forwardly" and "front" mean at or to the side where the bracket assembly 36 is located, unless indicated otherwise or otherwise readily apparent from the context use. The arrow Fw of FIG. 1 indicates the forward direction. The terms "rear," "reverse," "backwardly" and "rearwardly" mean at or to the opposite side of the front side.

A hydraulic tilt and trim adjustment system 56 is provided between the swivel bracket 44 and the clamping bracket 46 for tilt movement (raising or lowering) of the swivel bracket 44 and the drive unit 34 relative to the clamping bracket 46. Otherwise, the outboard motor 30 can have a manually operated system for tilting the drive unit 34. Typically, the term "tilt movement", when used in a broad sense, comprises both a tilt movement and a trim adjustment movement.

The illustrated drive unit 34 comprises a power head 58 and a housing unit 60, which includes a driveshaft housing 62 and a lower unit 64. The power head 58 is disposed atop the housing unit 60 and includes an internal combustion engine 32 that is positioned within a protective cowling assembly 66, which preferably is made of plastic. In most arrangements, the protective cowling assembly 66 defines a generally closed cavity 68 in which the engine 32 is disposed. The engine, thus, is generally protected from environmental elements within the enclosure defined by the cowling assembly 66.

The protective cowling assembly 66 comprises a top cowling member 70 and a bottom cowling member 72. The top cowling member 70 is detachably affixed to the bottom cowling member 72 by a coupling mechanism so that a user, operator, mechanic or repairperson can access the engine 32 for maintenance or for other purposes. In some arrangements, the top cowling member 70 is hingedly attached to the bottom member such that the top cowling member 70 can be pivoted away from the bottom cowling member for access to the engine. Preferably, such a pivoting allows the top cowling member to be pivoted about the rear end of the outboard motor, which facilitates access to the engine from within the associated watercraft 40.

The top cowling member 70 preferably has a rear intake opening 76 defined through an upper rear portion. A rear intake member with one or more air ducts is unitarily formed with or is affixed to the top cowling member 70. The rear intake member, together with the upper rear portion of the top cowling member 70, generally defines a rear air intake space. Ambient air is drawn into the closed cavity 68 via the rear intake opening 76 and the air ducts of the rear intake member as indicated by an arrow 78 of FIG. 1. Typically, the top cowling member 70 tapers in girth toward its top surface, which is in the general proximity of the air intake opening 76. The taper helps to reduce the lateral dimension of the outboard motor, which helps to reduce the air drag on the watercraft during movement.

The bottom cowling member 72 has an opening through which an upper portion of an exhaust guide member or support member 80 extends. The exhaust guide member 80 preferably is made of aluminum alloy and is affixed atop the driveshaft housing 62. The bottom cowling member 72 and the exhaust guide member 80 together generally form a tray. The engine 32 is placed onto this tray and can be affixed to the exhaust guide member 80. The exhaust guide member 80 also defines an exhaust discharge passage through which burnt charges (e.g., exhaust gases) from the engine 32 pass.

The engine 32 in the illustrated embodiment operates on a four-cycle combustion principle. This type of engine, however, merely exemplifies one type of engine on which various aspects and features of the present invention can be suitably used. Preferably, the engine has at least two cylinder banks, which extend separately of each other. For instance, an engine having an opposing cylinder arrangement can use certain features of the present invention. Nevertheless, engines having other numbers of cylinders, having other cylinder arrangements (in-line, opposing, etc.), and operating on other combustion principles (e.g., crankcase compression two-stroke or rotary) also can employ various features, aspects and advantages of the present invention. In addition, the engine can be formed with separate cylinder bodies rather than a number of cylinder bores formed in a cylinder block. Regardless of the particular construction, the engine preferably comprises an engine body that includes at least one cylinder bore.

A crankshaft 82 extends generally vertically through a cylinder block 84 and can be journaled for rotation about a rotational axis 86 by several bearing blocks. Connecting rods (not shown) couple the crankshaft 82 with the respective pistons (not shown) in any suitable manner. Thus, the reciprocal movement of the pistons (not shown) rotates the crankshaft 82.

Preferably, the cylinder block 84 is located at the forwardmost position of the engine 32; a cylinder head assembly 88 being disposed rearward from the cylinder block 84. Generally, the cylinder block 84 (or individual cylinder bodies) and the cylinder head assembly 88 together define the engine 32. Typically, at least these major engine assemblies 84 and 88 are substantially made of aluminum alloy. The aluminum alloy advantageously increases strength over cast iron while decreasing the weight of the engine 32.

The engine 32 will also typically include a cooling system, a lubrication system and other systems, mechanisms or devices other than the systems described above.

With reference again to FIG. 1, the driveshaft housing 62 depends from the power head 58 to support a driveshaft 90 which is coupled with the crankshaft 82 and which extends generally vertically through the driveshaft housing 62. The driveshaft 90 is journaled for rotation and is driven by the crankshaft 82. The driveshaft housing 62 defines an internal section 92 of the exhaust system that leads the majority of exhaust gases to the lower unit 64. The internal section 92 includes an idle discharge portion that is branched off from a main portion of the internal section 92 to discharge idle exhaust gases directly out to the atmosphere through a discharge port that is formed on a rear surface of the driveshaft housing 62 in idle speed of the engine 32.

The lower unit 64 depends from the driveshaft housing 62 and supports a propulsion shaft 94 that is driven by the driveshaft 90. The propulsion shaft 94 extends generally horizontally through the lower unit 64 and is journaled for rotation. A propulsion device is attached to the propulsion shaft 94. In the illustrated arrangement, the propulsion device is a propeller 96 that is affixed to an outer end of the propulsion shaft 94. The propulsion device, however, can take the form of a dual counter-rotating system, a hydrodynamic jet, or any of a number of other suitable propulsion devices.

Electrical Generator

Figure 2:
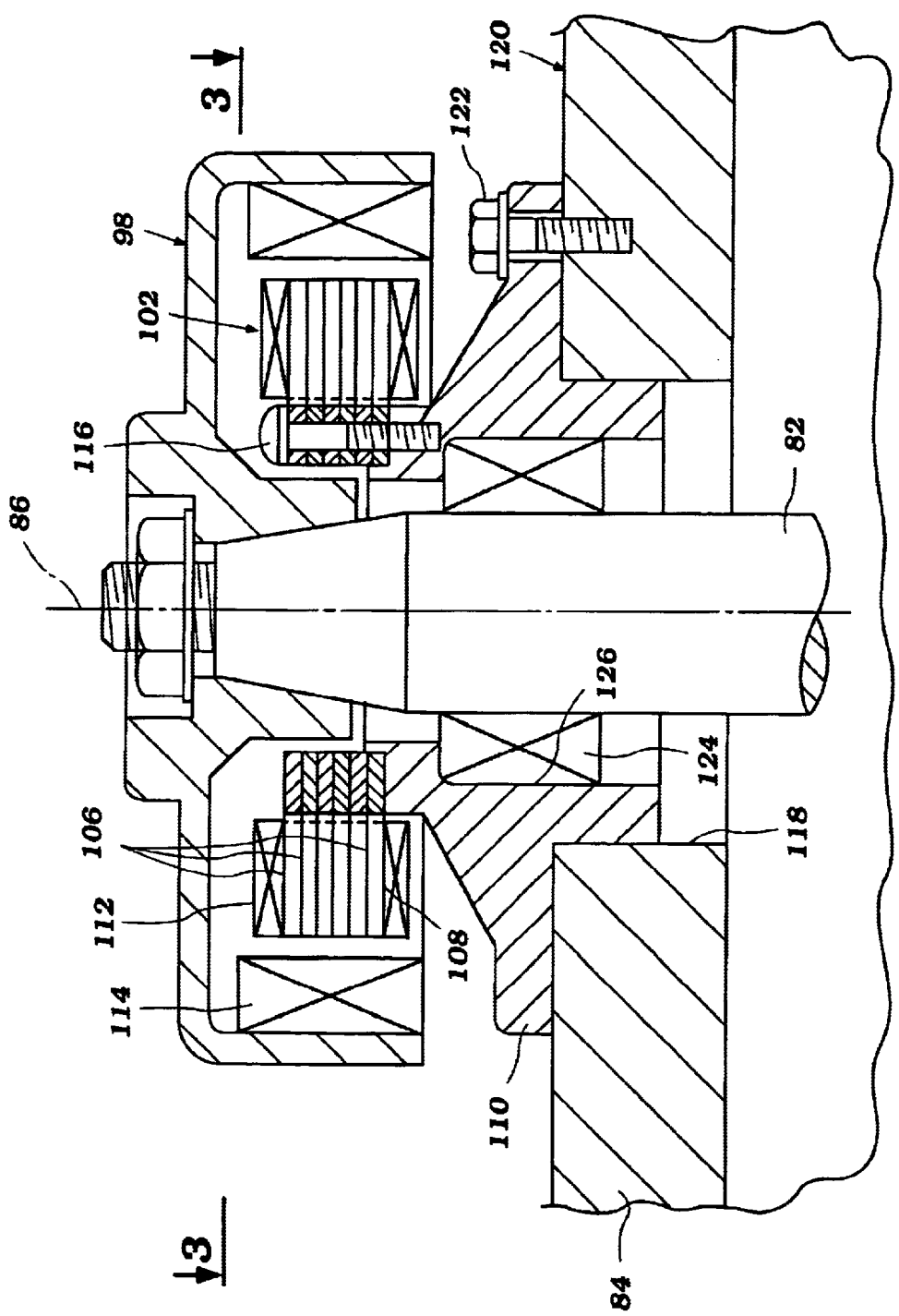
FIG. 2 is a sectioned side view of a generator assembly.
Figure 3:
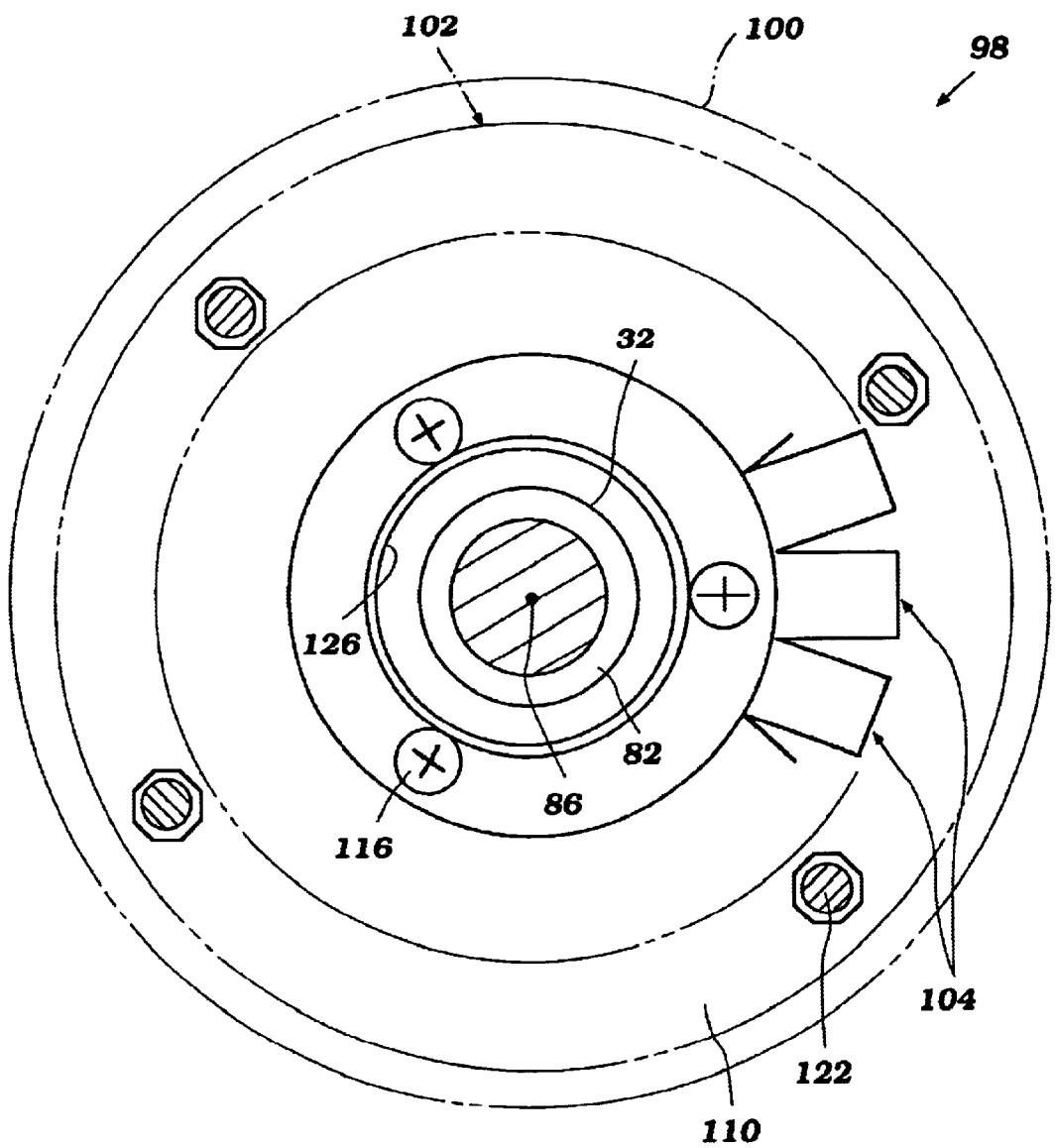
FIG. 3 is a top sectional view taken along line 3—3 of FIG. 2.
Figure 4:
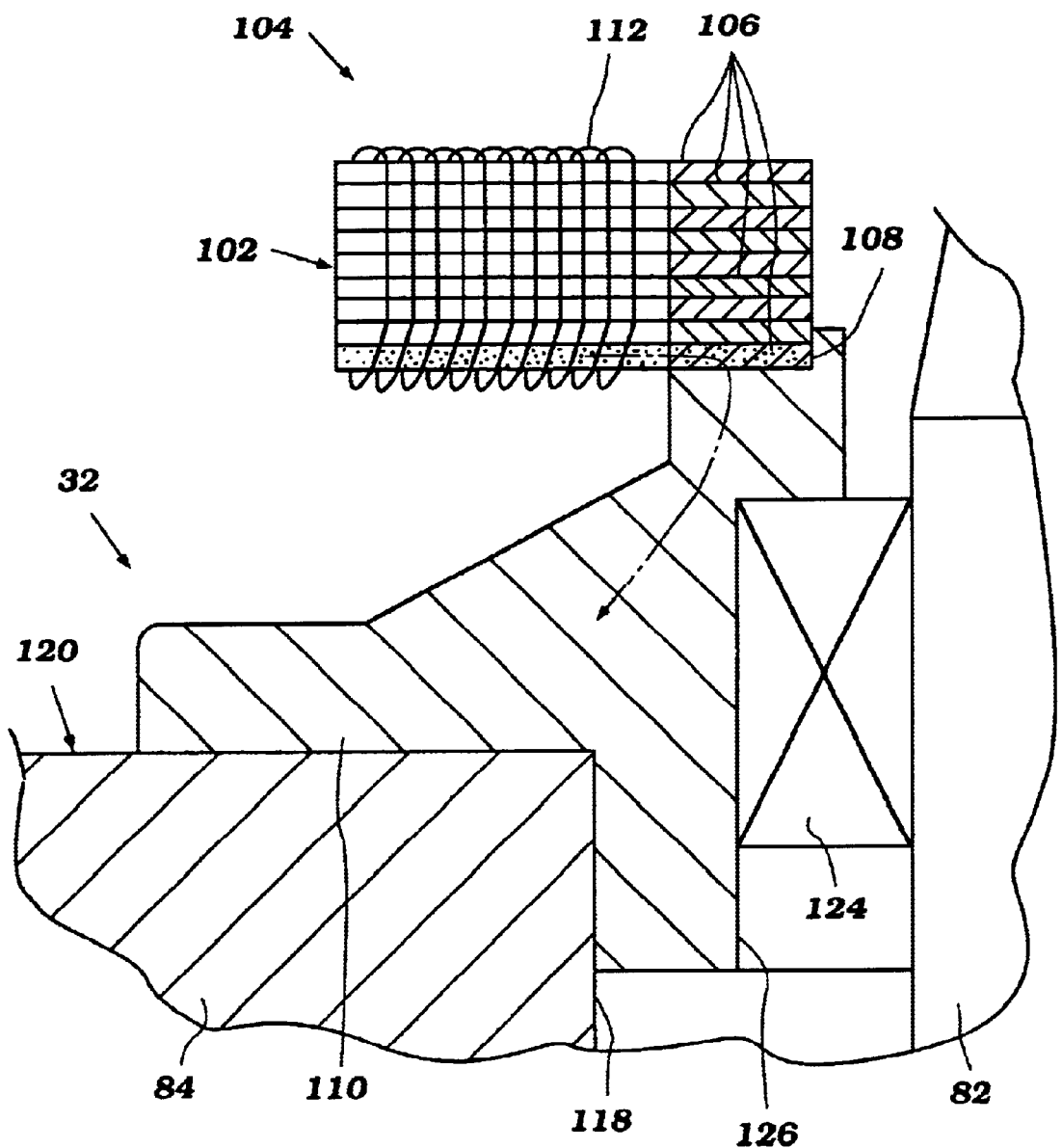
FIG. 4 is an enlarged view of a stator assembly configured in accordance with a preferred embodiment of the present invention.

A preferred embodiment of the improved electrical generator 98 is shown in FIGS. 2, 3, and 4.

A stator core 102 includes a plurality of radially extended armature legs 104. These armature legs 104 are uniformly spaced in a circle and attached to an aluminum stator bracket 110. Each of the armature legs is advantageously made up of a series of uniformly spaced plates 106 of iron or other material having a high magnetic permeability. Each plate may be insulated from its adjoining plates by a suitable dielectric to inhibit eddy currents.

By high magnetic permeability is meant sufficient permeability to provide ample electrical current. Typically this magnetic permeability will be equal to or greater than the magnetic permeability of iron.

A significant feature of the preferred embodiment of this invention is an efficient, dissipation of heat from the armature. As best shown in the enlarged view of FIG. 4, each armature leg 104 includes an aluminum heat conductive plate 108 having a high thermal conductivity abutted against the plate 106 that is closest to the armature stator bracket. Plate 108 has advantageously the same planar dimensions, i.e., length and width, as each of the iron plates 106. However, the thickness of plate 108 may be greater or less then the plate 106 as determined by the heat conduction requirements.

By high thermal conductivity is meant superior heat dissipation properties in order to transfer heat efficiently and effectively. Typically this thermal conductivity will be greater than the thermal conductivity of iron or iron alloys. The thermal conductivity of aluminum compared to iron and other metals can be referenced in Mark's Standard Handbook for Mechanical Engineers, page 4–60, table 1.

Each of the armature legs further includes an electrical winding 112, typically provided by a suitable number of turns of insulated wire 112. This armature coil 112 is wound around both the stack of iron sheets 106 and the aluminum plate 108 such that the plate 108 is an integral part of the stator armature. As a result, plate 108 is close proximity to both the stack of iron sheets 106 and the coil 112.

Aluminum heat conductive plate 108 is advantageously mounted to the aluminum stator bracket 110 of a sufficient mass designed to very effectively dissipate the generated heat from the armature legs 104.

A cup shaped flywheel rotor 100 preferably protected by a generator cover 101 is positioned above atop the crankshaft 82 and is mounted for rotation with the crankshaft 82. Various permanent magnets 114 are positioned around the circumference of the flywheel rotor 100 that induces by magnetic induction an electrical current through various general coils 112. As well known in the art, this electrical current is used to charge the boat battery or batteries as well as the various electrical needs of the engine 32 and watercraft.

Bolts 116 secure each of the armature legs 104 to the stator bracket 110. The stator bracket 110 is mounted to a through hole 118 in the engine block 84 or stationary member 120 with bolts 122. A bearing 124 that guides and supports the crankshaft 82 is mounted within the stator bracket 110.

The electrical resistance heating within the stator armature is transferred from the highly thermal conductive aluminum heat sink plates 108 within each of the armature legs 104 to the stator bracket 110. Bracket 110 in turn directly abuts the engine block 84. As a result, the armature legs 104 are maintained at a safe operating temperature. The alternate long-and-short dashed line shown in FIG. 4 illustrates the path of heat transfer from the armature legs 104 to the stator bracket 110.

The present invention successfully satisfies both the growing demand for a compact design as well as effective heat dissipation.

Of course, the foregoing description is that of a preferred construction having certain features, aspects, and advantages in accordance with the present invention. Various changes and modifications may be made to the above described arrangements without departing from the spirit and scope of the invention, as defined by the appended claims.

What is claimed is:

1. An outboard motor having an electrical generator and integral cooling arrangement therefor, the motor including:

an internal combustion engine having an engine block, a crankshaft, and a bearing that journals a portion of the crankshaft for rotation within the engine block, an electrical generator comprising:
  (i) a stator armature comprising a series of stacked plates formed of a material having high magnetic permeability,
  (ii) a heat conductive plate having substantially the same planar dimensions as the stacked plates, the heat conductive plate formed of a material having a higher heat conductivity than that of the stacked plates, the heat conductive plate abutted against one of the stacked plates;
  (iii) an armature coil wound around the assembly of the stacked plates of magnetic permeability and the heat conductor plate so that the heat conductive plate is an integral part of the stator armature; and
  (iv) a rotor coupled to the crankshaft so as to rotate therewith, the rotor having magnets that are arranged next to the stator armature; and
a stator bracket formed of a material having high heat conductivity, the bracket directly attached to the engine block and the conductive plate integral with the stator armature so that the resistance heating within the stator armature is transferred through the conductive plate and the stator bracket to the engine block.

2. An electrical generator for a watercraft, the generator having an integral cooling arrangement comprising a stator armature comprising:
  (i) a series of stacked plates formed of a material having high magnetic permeability;
  (ii) a heat conductive plate having substantially the same planar dimensions as the stacked plates, the heat conductive plate formed of a material having a higher heat conductivity than the stacked plates, the heat conductive plate abutted against one of the stacked plates having high magnetic permeability; and
  (iii) an armature coil wound around the assembly of the stacked plates of magnetic permeability and the heat conductive plate so that heat conductive plate is an integral part of the stator armature; and
  (iv) a rotor rotating relative to the stator armature. plurality of permanent magnets arranged next to the stator armature.

3. An electrical generator having an integral cooling arrangement comprising:

a stator armature comprising a series of stacked plates formed of a material having magnetic permeability;

a heat conductive plate having substantially the same planar dimensions as the stacked plates, the heat conductive plate formed of a material having a higher heat conductivity than the stacked plates;

the heat conductive plate abutted against one of the stacked plates having magnetic permeability; and an armature coil wound around the assembly of the stacked plates of magnetic permeability so that the heat conductive plate is an integral part of the stator armature.

4. The electrical generator of claim 3, wherein the heat conductive plate is formed of aluminum.

5. The electrical generator of claim 3, wherein the heat conductive plate is formed of a material with a thermal conductivity equal to that of aluminum.

6. The electrical generator of claim 3, wherein the heat conductive plate is formed of a material with a thermal conductivity equal or greater than that of aluminum.

7. The electrical generator of claim 3, wherein the stator bracket is formed of aluminum.

8. The electrical generator of claim 3, wherein the stacked plates having magnetic permeability are formed of iron.

9. An electric generator driven by a marine engine having a crankshaft;
   electrical generator being located at one end of the crankshaft and comprising:
   a series of uniformly spaced radially extended armature legs made of metal having magnetic permeability attached to a similar shaped aluminum plate; and
   a rotor attached to the crankshaft containing a plurality of magnets to induce an electrical current in the armature legs.

10. The electric generator configuration of claim 9, wherein the armature legs and aluminum plate are mounted to an aluminum stator bracket.

11. The electric generator configuration of claim 9, wherein the heat induced is designed to be directly dissipated through the aluminum plate to the stator bracket.

12. The electric generator configuration of claim 10, wherein the stator bracket is mounted to the cylinder block of the marine engine.

13. The electric generator configuration of claim 9, wherein the rotor is a flywheel rotor.

* * * * *